United States Patent
Zerillo et al.

(10) Patent No.: US 8,107,497 B2
(45) Date of Patent: Jan. 31, 2012

(54) AUTO BANDWIDTH NEGOTIATION, REROUTE AND ADVERTISEMENT

(75) Inventors: Anthony J. Zerillo, Kansas City, MO (US); Jeffrey S. Stafford, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 92 days.

(21) Appl. No.: 12/178,363

(22) Filed: Jul. 23, 2008

(65) Prior Publication Data

US 2010/0020822 A1   Jan. 28, 2010

(51) Int. Cl.
  *H04J 3/10* (2006.01)
  *H04L 12/28* (2006.01)
  *H04L 12/56* (2006.01)
  *H04L 12/64* (2006.01)

(52) U.S. Cl. ........ 370/468; 370/466; 370/231; 370/235; 709/219; 709/228; 709/233

(58) Field of Classification Search ............ 370/231, 370/235, 236, 468, 466; 709/219, 227–229, 709/232, 233
See application file for complete search history.

(56) References Cited

U.S. PATENT DOCUMENTS

| | | | |
|---|---|---|---|
| 6,636,894 B1* | 10/2003 | Short et al. | 709/225 |
| 7,257,640 B1* | 8/2007 | Callocchia et al. | 709/233 |
| 2004/0010592 A1* | 1/2004 | Carver et al. | 709/226 |
| 2005/0203945 A1* | 9/2005 | Thompson | 707/102 |
| 2006/0215650 A1* | 9/2006 | Wollmershauser et al. | 370/389 |
| 2006/0253446 A1* | 11/2006 | Leong et al. | 707/9 |
| 2006/0274756 A1* | 12/2006 | Karia et al. | 370/395.1 |
| 2007/0121664 A1* | 5/2007 | Szczebak et al. | 370/449 |
| 2008/0034404 A1* | 2/2008 | Pereira et al. | 726/2 |
| 2009/0178058 A1* | 7/2009 | Stillwell et al. | 719/317 |

* cited by examiner

*Primary Examiner* — Chi Pham
*Assistant Examiner* — Ahmed Elallam

(57) ABSTRACT

A bandwidth negotiation system including a first network, a plurality of end user devices in communication with the network, a multiplexing unit communicatively coupled to the network, a second network, and an analyzing unit in communication with a second network. In addition, one of the plurality of end user devices is configured to send a data message to the multiplexing unit via the first network, and the analyzing unit is configured to receive the data message from the multiplexing unit via the second network and to extract a first identifier and a second identifier from the data message.

18 Claims, 6 Drawing Sheets

AUTO BANDWIDTH NEGOTIATION, REROUTE AND ADVERTISEMENT

BACKGROUND

The present invention generally relates to increasing the data capacity of a network connection between two devices. In particular, the invention relates to methods and other accommodations for increasing the data capacity of a network connection based on the network address to which or from which data is requested.

As more and more computer applications require multimedia files to operate, computer networks require more bandwidth to deliver large files from servers to workstations. Typically in a computer network, a network device will allocate a specific amount of bandwidth to individual workstations on the network. However, at any given time one workstation may not use any bandwidth, while other computers require more bandwidth than they are allocated. Because of this non dynamic allocation, some network users experience slow downloading and uploading of files.

For multimedia applications, this results in delays in video and audio signals, static on the screen, and the freezing of images. Additionally, for file transfers a slow network connection can increase the amount of time required to upload files wasting time and resources. If the problem becomes critical, the service provider may receive calls to their customer service center or lose customers all together due to slow network performance.

SUMMARY

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

In one embodiment embodying principles of the invention, a bandwidth negotiation system includes a first network, a plurality of end user devices communicatively coupled to the network, a multiplexing unit communicatively coupled to the network, a second network, and an analyzing unit communicatively coupled to the second network. In addition, one of the plurality of end user devices is configured to send a data message to the multiplexing unit via the first network, and the analyzing unit is configured to receive the data message from the multiplexing unit via the second network and to extract a first identifier and a second identifier from the data message.

In another embodiment embodying principles of the invention, a method of increasing data capacity on a network includes the steps of receiving a message requesting data from a end user device over a first network, extracting a first identifier and a second identifier from the message using a content storage unit, comparing the second identifier to a list of second identifiers stored on the content storage unit; and determining if the second identifier received from the end user device exists in the list of second identifiers stored on the content storage unit.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION

Figure 1:
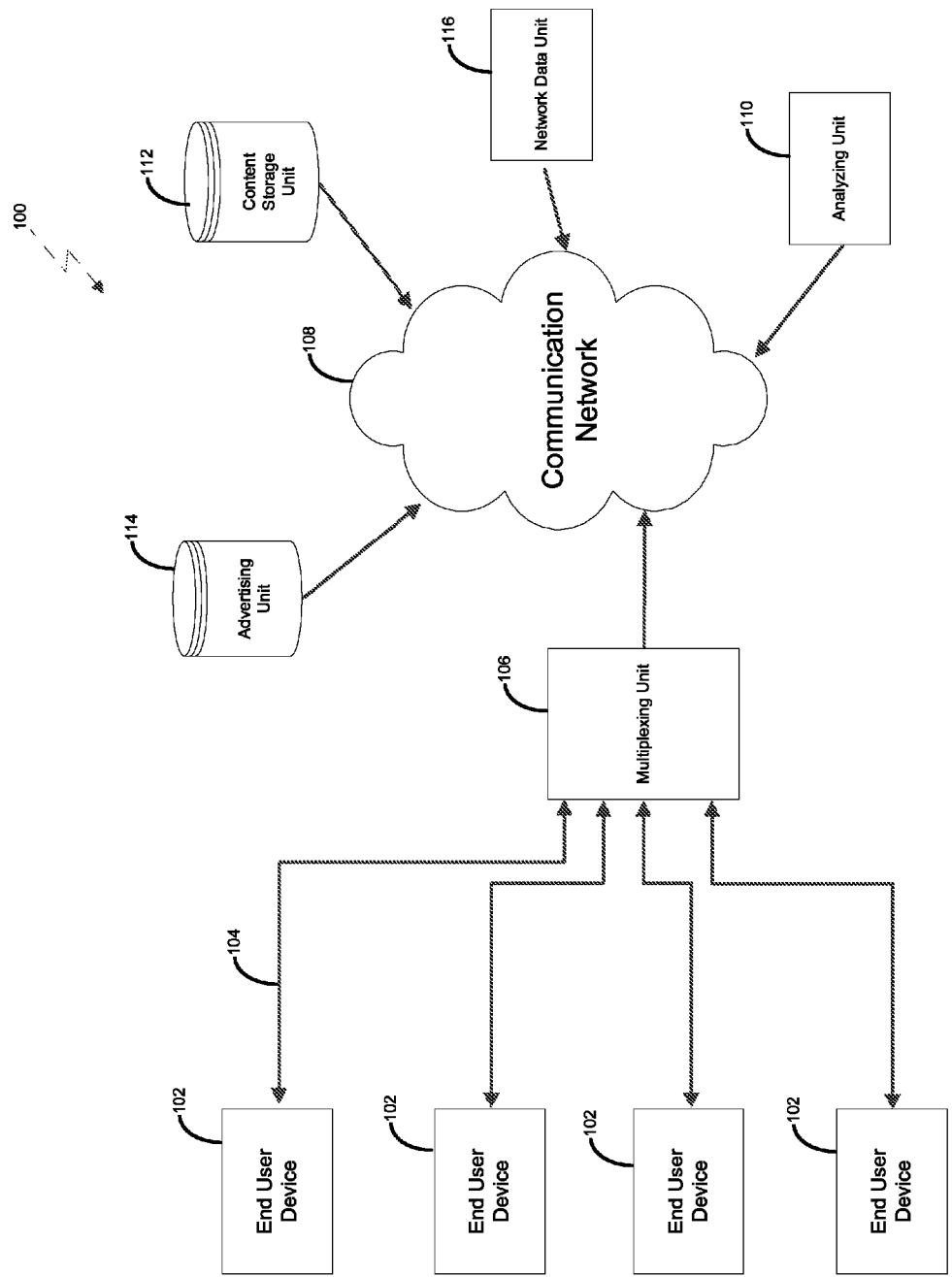
FIG. 1 depicts a schematic representing one embodiment of a bandwidth negotiation system consistent with the present invention.

Referring now to the drawings which depict different embodiments consistent with the present invention, wherever possible, the same reference numbers will be used throughout the drawings and the following description to refer to the same or like parts.

FIG. 1 depicts a schematic of a bandwidth negotiation system 100. The bandwidth negotiation system 100 comprises a plurality of end user devices 102, each of which is in communication with a multiplexing unit 106 over a respective network line 104. The multiplexing unit 106 is in communication with the end user devices 102 and a communication network 108. An analyzing unit 110, a content storage unit 112, an advertising unit 114 and a network data unit 116 each communicate over the communication network 108.

In one embodiment, a particular end user device 102 is a device communicating using a DSL modem. Alternatively, a particular end user device 102 may be a device communicating using an ADSL modem, a cable modem, a wireless transceiver, or another network interface or gateway, or any other device capable of interfacing with and facilitating communication over a network. Such devices may include, for example, a personal computer, workstation, personal digital assistant, cell phone, messaging device, set top box, or any other suitable end user device.

In one embodiment, the communication network 108 is the Internet. Alternatively, communication network 108 may be any private or public communication network such as a Local Area Network ("LAN"), Wide Area Network ("WAN"), Peer-to-Peer Network, asynchronous transfer mode ("ATM") network, or any other suitable network, using standard or proprietary communication protocols. The communication network 108 may include hardwired as well as wireless branches.

In one embodiment, a particular network line 104 may be an Ethernet connection over a LAN. Alternatively, a particular network line 104 may be any private or public communication network such as a WAN Peer-to-Peer Network, ATM network, or any other suitable network or connection, using standard or proprietary communication protocols. The network lines 104 may include hardwired as well as wireless branches.

The communication network 108 may be any private or public communication network such as a LAN, WAN, Peer-to-Peer Network, using ATM, or the Internet, using a standard or proprietary communication protocols. The communication network 108 may include hardwired as well as wireless branches.

In one embodiment, a particular network line 104 may be an Ethernet connection over a LAN. Alternatively, a particular network line 104 may be any private or public communication network such as a LAN, WAN, Peer-to-Peer Network, using ATM, or using a standard or proprietary communication protocols. The network lines 104 may include hardwired as well as wireless branches. The end user devices 102 may include, but are not limited to, a workstation, a handheld device, a personal data assistant or any other device capable of communicating over a network.

In one embodiment, multiplexing unit 106 is a switch. However, alternatively, multiplexing unit 106 may be a router, gateway, network-to-network interface, server, or any other suitable network device. The multiplexing unit 106 is operatively configured to receive messages from the network lines 104 and to transmit the received messages to the communication network 108. In one embodiment of the present invention, the network lines 104 may utilize a different communication protocol than the communications network 108. As an illustrative example, the network lines 104 may communicate using ATM and the communications network 108 may communicate using the Internet Protocol. In this embodiment, the multiplexing unit 106 is operatively configured to receive messages from each end user device 102 and convert the messages from the network line 104 protocol to the communications network 108 protocol. Also, multiple multiplexing units 106 may be connected to the communications network 108 to connect to the plurality of end user devices 102.

In one embodiment, units 110, 112, 114, and 116 are embodied by one or more servers. Alternatively, each of units 110, 112, 114, and 116 may be implemented using any combination of hardware and software, whether as incorporated in a single device or as functionality distributed across multiple platforms and devices. In general, analyzing unit 110 receives messages from multiplexer 106, reviews the messages from the multiplexing unit 106 and analyzes the messages to determine the network address of the network data unit 116 sending the message, and then transmits the network address of the network data unit 116 to the content storage unit 112. The content storage unit 112 determines if the network data unit 116 address resides in a content library stored on the content storage unit 112. If the network address of the network data unit 116 resides in a network library, the content storage unit 112 transmits a notification to the multiplexing unit 106 to increase the data capacity to the port communicating with the network data unit 116.

Figure 2:
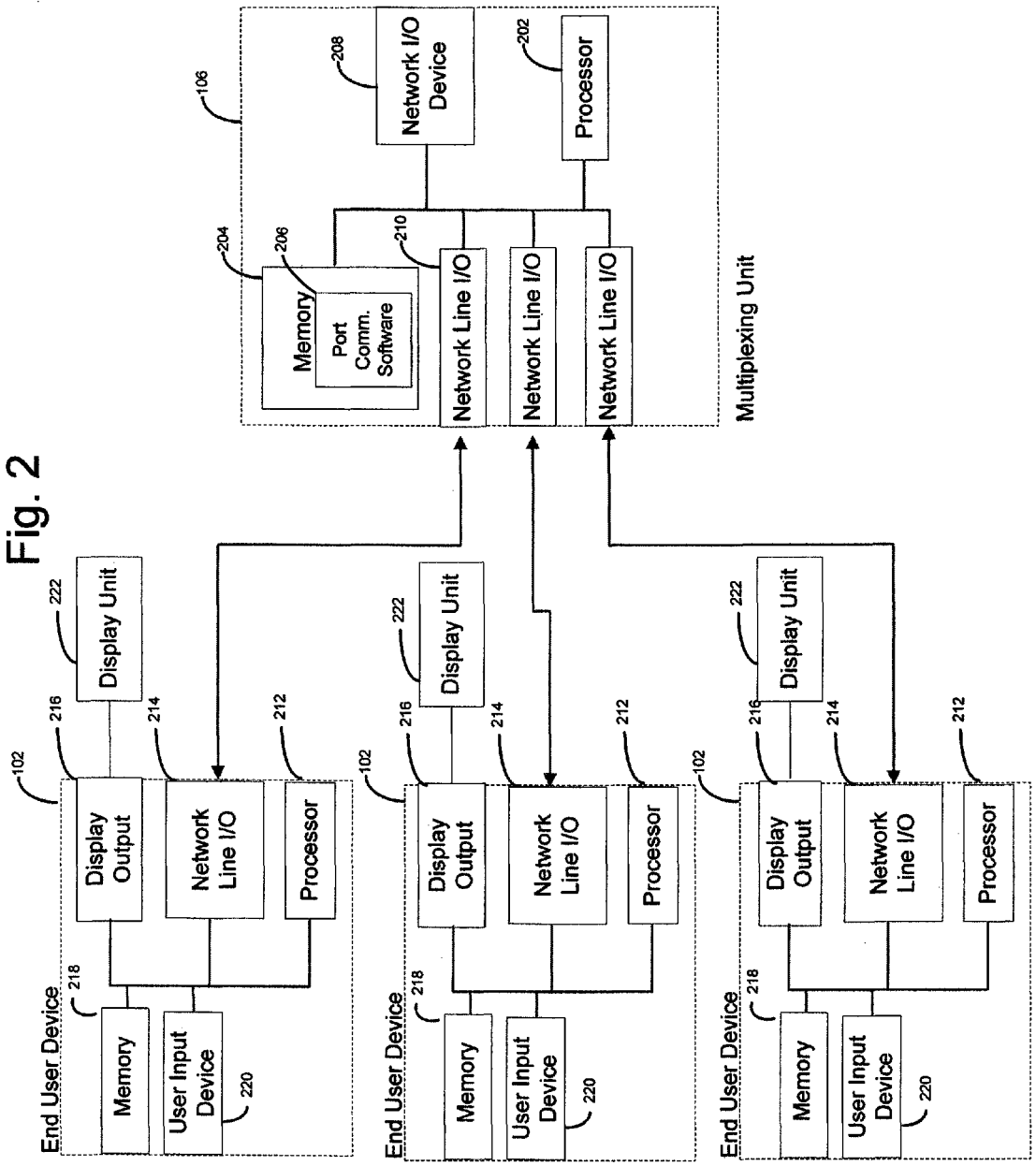
FIG. 2 depicts one embodiment of a multiplexing unit and end user devices consistent with the present invention.

FIG. 2 depicts one embodiment of the multiplexing unit 106 and end user devices 102 consistent with the present invention. The multiplexing unit 106, includes a central processing unit 202, memory 204, port communication software 206, a network I/O device 208 and a plurality of network line I/O devices 210.

In one embodiment, the network I/O device 208 is a network interface card. Alternatively, the network I/O device 208 may be any suitable I/O device, operatively configured to communicate with the network 108.

In one embodiment, the port communication software 206 running in the memory 204 of the multiplexing unit 106 is operatively configured to simultaneously receive requests for data from each of the plurality of end user devices 102 via each network line I/O device 210. Alternatively, the port communication software 206 may be any other combination of software and hardware suitable to manage the communication of data from end user devices 202 over I/O devices 208. The port communication software 206 is configured to establish communication connections between end user devices 102 and network data units 116 on the communications network 108 and to coordinate file downloading and uploading between the end user devices 102 and the network data units 116.

In one embodiment, the port communication software 206 may be a compiled program running on a server, a process running on a microprocessor or any other suitable client selection software. Alternatively, the port communication software 206 may be any other combination of software and hardware suitable to manage the communication of data over I/O device 208. The port communication software 206 is operatively configured to control the data capacity of the connection between a end user device 102 and a network data unit 116 on the communications network 108. Requests from end user devices 102 may be, but are not limited to, requests to view a HTML page, request to upload data, requests to download data, and any other network communication request.

In one embodiment, the processor 202/212 may be a central processing unit ("CPU"), an application specific integrated circuit ("ASIC"), a microprocessor or any other suitable processing device. The memory 204/218 may include a hard disk, random access memory, cache, removable media drive, mass storage or configuration suitable as storage for data, instructions, and information. In one embodiment, the memory 204/218 and processor 202/212 may be integrated. The memory may use any type of volatile or non-volatile storage techniques and mediums. The display output 216 may be a composite video output, an RGB output, an HD video output or another suitable display output. The display unit 222 may be a liquid crystal display monitor or cathode ray tube monitor or any other suitable display device.

In one embodiment of the present invention, the multiplexing unit 106 may receive a message or request from at least one of the plurality of end user devices 102. The multiplexing unit 106 may be operatively configured to transmit the messages or requests to the communication network 108 via a network I/O device 208. In another embodiment, the multiplexing unit 106 may be operatively configured to transmit the message or request received from the end user devices to multiple communication networks 108 via a plurality of network I/O devices 208.

Each end user device 102 includes a processor 212, a network line I/O device 214, an optional display output 216 communicatively coupled to a display unit 222, an optional user input device 220 and memory 218. Each end user device 102 is communicatively coupled to the multiplexing unit 106 via the network line 104. Further, each end user device 102 is operatively configured to send messages and requests for data to the multiplexing unit 106 for conversion and transmission to the communications network 108. Also, each network line I/O device 214 is operatively configured to send and receive messages with at least one network line I/O device 210 on the multiplexing unit 106.

Figure 3:
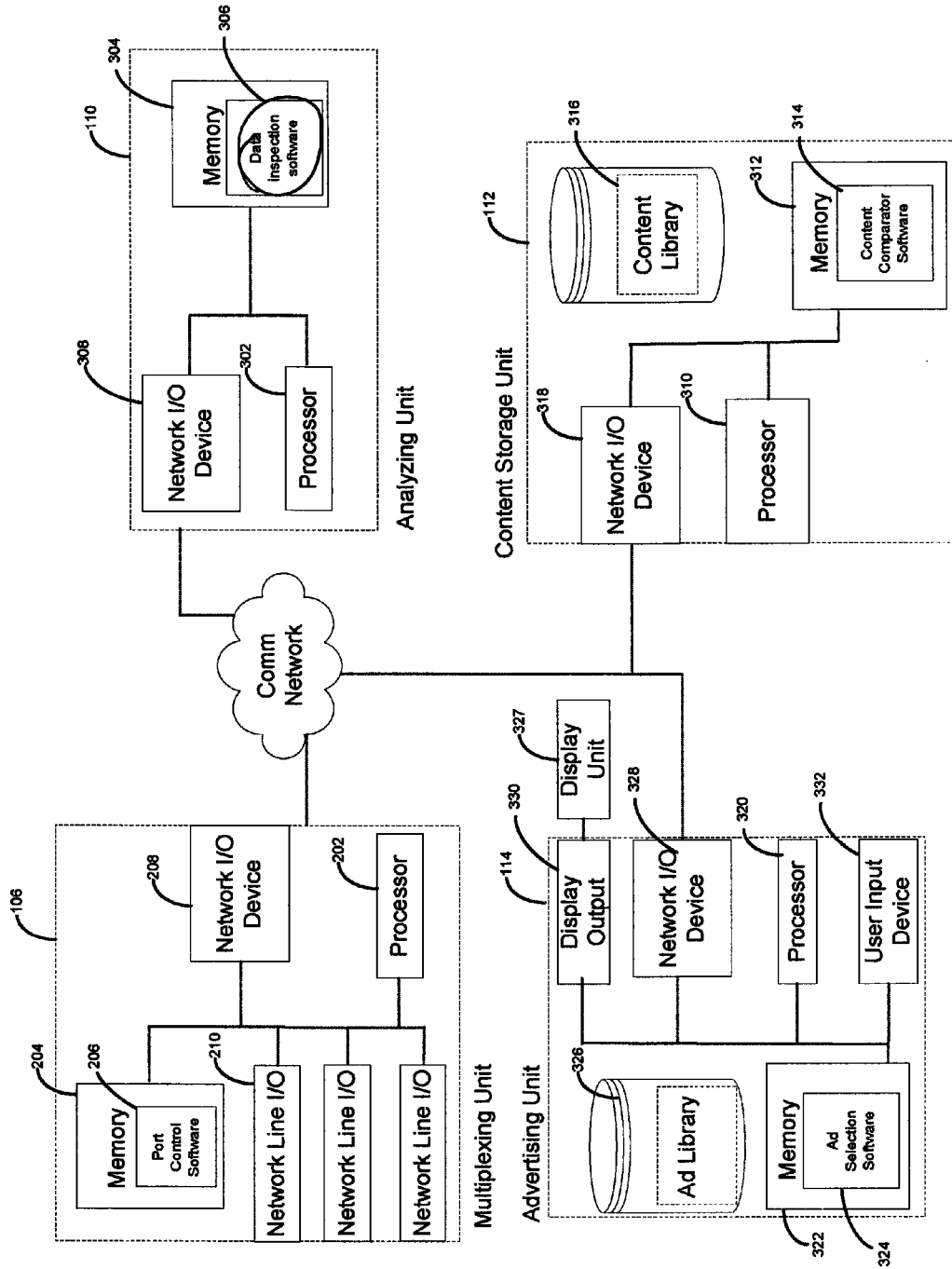
FIG. 3 depicts one embodiment of a multiplexing unit, analyzing unit, content storage unit and advertising unit consistent with the present invention.

FIG. 3 depicts one embodiment of the multiplexing unit 106, the analyzing unit 110, the content storage unit 112 and the advertising unit 114 consistent with the present invention. The multiplexing unit 106, analyzing unit 110, the content storage unit 112 and the advertising unit 114 are communicatively coupled via the communications network 108.

The analyzing unit 110 includes a processor 302, memory 304 running data inspection software 306, and a network 110 device 308. The network I/O device 308 is operatively configured to communicate with the communications network 108. The data inspection software 306 is operatively configured to receive a data message from the multiplexing unit 106 and to remove predefined portions of data from the data message. As an illustration of this embodiment, a data message in a TCP/IP protocol may be sent from an end user device 102 to the multiplexing unit 106. The multiplexing unit 106 may send the data message to the analyzing unit's network I/O device 308 via the communications network 108. The data inspection software 306, running on memory 304 of the analyzing unit 110, may parse the data message and remove data from the data message. The data removed from the data message, may include, but not be limited to, the end user device's 102 network address, the network address of the network data unit 116, the data contents of the message, and any other data contained in a data message.

The content storage unit 112 includes a processor 310, memory 312 running content comparator software 314, a content library 316, and a network I/O device 318. The network I/O device 318 is operatively configured to communicate with the communications network 108. The content comparator software 314 running in the memory 312 is operatively configured to receive data from the analyzing unit 108 and to compare the data with data stored in the content library 316.

In one embodiment, the content library 316 is a database. Alternatively, the content library 316 may be any other suitable memory structure configured to store and logically organize a plurality of data. The content library 316 may contain a listing of all network addresses of devices authorized to increase the data capacity of a data connection between an end user device 102 and a network data unit 116 located on the communications network 108 or another network communicatively coupled to the communications network 108. Each entry in the content library 316 may be assigned a unique identifier which enables the content comparator software 314 to efficiently request data for comparison with data extracted by the analyzing unit 110. As an illustrative example, the content library 316 may be a rational database containing a end user device address and network address of a network data unit 116.

The advertising unit 114 includes a processor 320, memory 322 running advertisement selection software 324, an advertisement library 326, a network I/O device 328, an optional display output 330 in communication with a display unit 327 and an optional user input device 332. The network I/O device 328 is operatively configured to communicate with the communications network 108 and to send and receive data with the analyzing unit 110 and the multiplexing unit 106. The advertisement selection software 324 running in the memory 322 is operatively configured to receive data from the analyzing unit 110 and to retrieve advertisements stored in the advertisement library 326 based on the data received.

In one embodiment, the advertisement library 326 is a database. Alternatively, the advertisement library 326 is configured to store and logically organize a plurality of data. The advertisement library 326 may contain a plurality of advertisement messages for different clients. Each entry in the advertisement library 326 may be assigned a unique identifier which enables the advertisement selection software 324 to efficiently request data. As an illustrative example, the advertisement library 326 may be a relational database containing advertisement messages based on client accounts, as well as network locations of multimedia files.

Figure 4A:
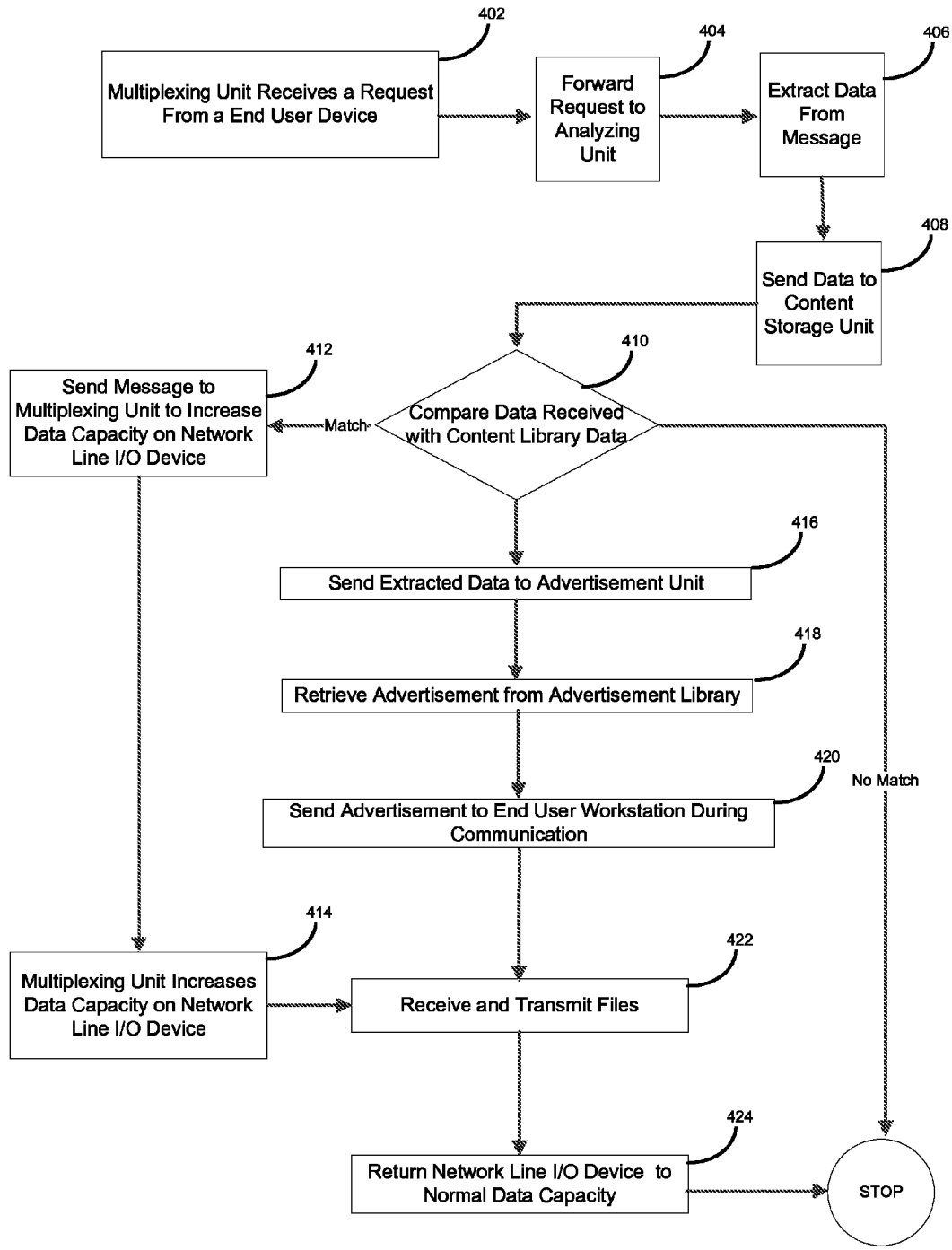
FIG. 4A depicts a schematic representing one embodiment of the operation of a bandwidth negotiation system consistent with the present invention.

FIG. 4A depicts a schematic representing the operation of the bandwidth negotiation system 100 consistent with the present invention. First, the multiplexing unit 106 receives a message or request from at least one end user device 102 via at least one of the plurality of network line I/O devices 214 (Step 402). Next, the message or request is forwarded to the analyzing unit 110 (Step 404). The network I/O device 308 on the analyzing unit 110 receives the message from the multiplexing unit 106 and the data inspection software 306, running on the analyzing unit 110 memory 304, removes data from the message or request (Step 406). The removed data is then transmitted to the content storage unit 112 for further analysis (Step (408).

The content comparator software 314 running on the content storage unit 112 memory 312 compares the data received from the analyzing unit 110 with data stored in the content library 316. If no match is found in the content library 316, the process stops. If a match is found, a message is sent from the content storage unit 112 to the multiplexing unit 106 instructing the port control software 206 to increase the data capacity of the communication connection with the end user device 102 (Step 412). The network I/O device 208 on the multiplexing unit 106 receives and forwards the instructions from the content storage unit 112 to the port control software 206 which increases the data capacity of the communication connection between the end user device and the network data unit 116 via the network line I/O device 210 in communication with the appropriate end user device 102 (Step 414). Simultaneously, the content storage unit 112 sends the extracted data to the advertisement unit 114 (Step 416).

The advertisement selection software 324 running on the memory 322 of the advertisement unit 114 retrieves an advertising message from the advertisement library 326 based on the data received from the content storage unit 112 (Step 418). The advertisement unit 114 sends the advertisement message to the multiplexing unit 106 which then sends the message to the end user device 102 which made the request (Step 420). Once the transmission of files between the end user device 102 and the network data unit 116 is completed, the port control software 206 returns the network line I/O device 210 to a lower data capacity (Step 424).

In one illustrative embodiment consistent with the present invention, one of the end user devices 102 sends a request, via the network line 104, to download a file from a network data unit 116 located on the communication network 108. The multiplexing unit 106 receives the request via the network line I/O device 210 in communication with an end user device 102. The port control software 206 on the multiplexing unit 106 receives the request and transmits the request to the analyzing unit 110 via the communications network 108. The data inspection software 306 on the analyzing unit 110 removes the end user device 102 network address and the network address of the network data unit 116. The data inspection software 306 transmits the network address of the network data unit 116 to the content storage unit 112 via the communication network 108.

The content comparator software 314 on the content storage unit 112 queries the content library 316 to determine if the network address of the network data unit 116 resides in the content library 316. If the network address of the network data unit 116 resides in the content library 316, the content comparator software 314 transmits the network address of the network data unit 116 to the advertising unit 114.

The advertising selection software 324 on the advertising unit 114 queries the advertising library 326 for an advertisement associated with the network address of the network data unit 116. When an advertisement is returned from the advertisement library 326, the advertisement selection software 324 requests the end user device's 102 network address from the analyzing unit 110. The advertisement selection software 324 then sends the advertisement to the multiplexing unit 106 which transmits the advertisement to the end user device 102 via the network line 104. Once the end user device 102 receives the advertisement, the end user device 102 presents the advertisement to the display output 216 which is effective to display the advertisement on the display unit 218.

The content storage unit 112 is configured to send a message to the multiplexing unit 106 to maximize the data capacity of the network line I/O device 210 in communication with the end user device 102. After the data capacity is increased, the multiplexer forwards the request from the end user device 102 to the network data unit 116 via the communication network 108. Once the data transmission between the end user device 102 and the network data unit 116 is completed, the port control software 206 on the multiplexing unit 106 lowers the data capacity of the network line I/O device 210.

Figure 4B:
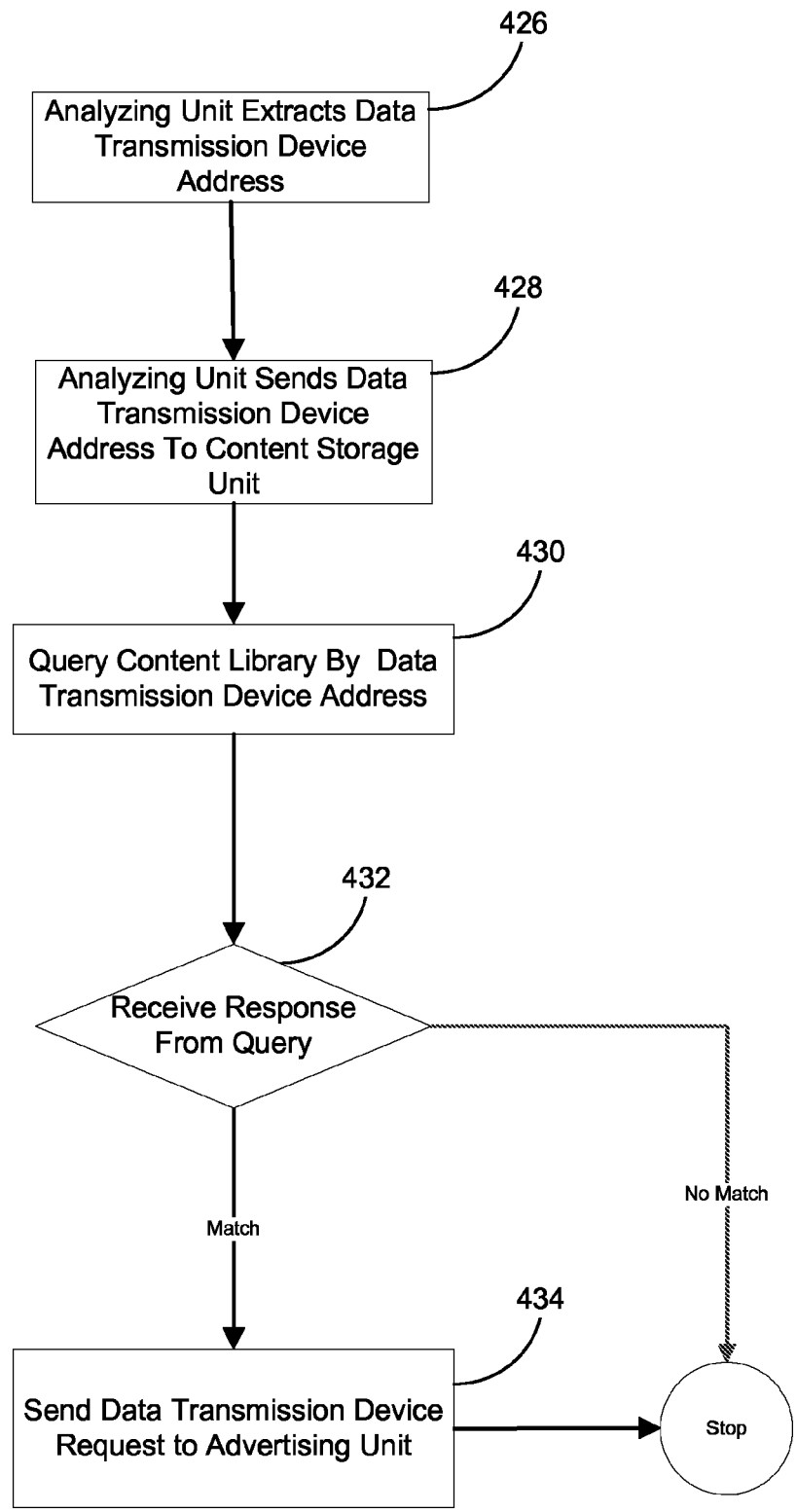
FIG. 4B depicts a schematic representing one embodiment of the operation of a content comparator software.

FIG. 4B depicts a schematic representing the operation of the content comparator software 314. First, the analyzing unit 110 extracts the network address of the network data unit 116 from a message received from an end user device 102 (Step 426). Next, the analyzing unit 110 sends the network address of the network data unit 116 to the content storage unit 112 (Step 428). The content comparator software 314 on the content storage unit 112 queries the content library 316 to determine if the network address of the network data unit 116 resides in the content library 316 (Step 432). If the network address of the network data unit 116 does not reside in the content library 316, the process stops. If the network address of network data unit 116 resides in the content library 316, the content comparator software 314 transmits the network address of the network data unit 116 to the advertising unit 114.

Figure 4C:
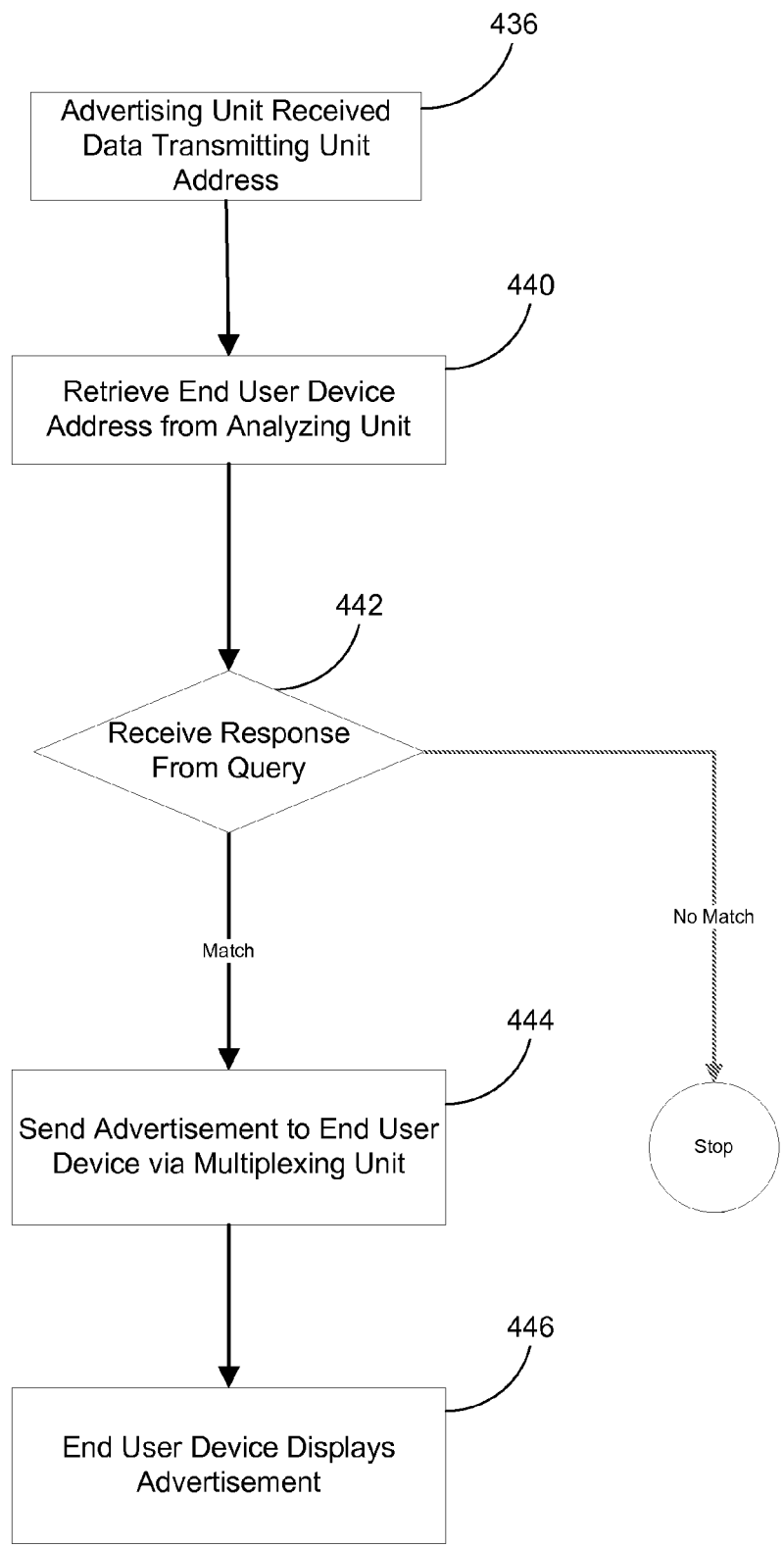
FIG. 4C depicts a schematic representing one embodiment of the operation of a advertising selection software.

FIG. 4C depicts a schematic representing the operation of the advertising selection software 324. First, the advertising unit 114 receives the network address of the network data unit 116 network address from the content storage unit 112 (Step 436). Next, the advertising unit 114 requests the network address of the end user device 102 from the analyzing unit (Step 440). The advertisement selection software 324 then queries the advertising library 326 for an advertisement message associated with the network address of the network data unit 116 (Step 442). If no advertisement is associated with the network address of the network data unit 116, the process stops. If a advertisement is associated with the network address of the network data unit 116, the advertisement selection software 324 sends the associated advertisement message to the end user device 102 via the multiplexing unit 106 (Step 444). The end user device 102 receives the advertisement message and presents the advertisement message to the display output 218. The advertisement message may include, but not be limited to, a flash file, a graphical interface panel, a web page, a computer graphic, a audio message, a video file, or any other multi-media file executable from an end user device 102.

Various embodiments of the present invention operate to increasing the data capacity of a network connection to its maximum level based on the address of a network data unit requesting data, problems with slow file downloading can be avoided. In addition, the quality of multimedia files sent to and from the network data unit and the end user device can be greatly improved. Also, in various embodiments of the present invention, preferred network data units may be given priority over other network data units improving customer satisfaction for the preferred network data units. Providing advertisements to end user devices during downloading provides a effective method of marketing to customers.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A bandwidth negotiation system comprising:
   a multiplexing unit;
   a content storage unit communicatively coupled to the multiplexing unit via a communication network; and
   an analyzing unit communicatively coupled to the multiplexing unit via the communication network; wherein,
   the multiplexing unit is configured to control the data capacity of a network communication connection between a network data unit and at least one end user device and to transmit a message to the analyzing unit, the network data unit comprising a network communication hardware component for communicating data to the at least one end user device via the communication network;
   the analyzing unit is configured to receive the message from the multiplexing unit and to extract an identifier from the message and to transmit the identifier to the content storage unit, and
   the content storage unit is configured to match the identifier with a plurality of identifiers stored in a library on the content storage unit and to instruct the multiplexing unit to increase the data capacity of the network upon finding a match, wherein the identifier is a network address of the network data unit that provides data to the at least one end user device.

2. The bandwidth negotiation system of claim 1, further wherein the identifier also includes a network address of an end user device in communication with the network data unit.

3. The bandwidth negotiation system of claim 2, wherein the multiplexer is configured to simultaneously communicate with the content storage unit, the analyzing unit and the network.

4. The bandwidth negotiation system of claim 1, wherein the multiplexing unit, the content storage unit, the analyzing unit, and the network data unit are separate systems, each communicatively coupled to the communication network.

5. The negotiation system of claim 2, wherein the multiplexing unit is configured to increase the data capacity of the network when a data transmission begins over the network.

6. The negotiation system of claim 1, wherein the multiplexing unit is configured to lower the data capacity when the data transmission ends.

7. The negotiation system of claim 1, wherein the identifier is included in a TCP/IP network packet.

8. The negotiation system of claim 2, further comprising:
   an advertisement unit communicatively coupled to the multiplexing unit, wherein the advertisement unit is configured to send a message to the multiplexer for transmission over the network.

9. A method of increasing data capacity on a network, the method further comprising the steps of:
   receiving message requesting data from an end user device through a multiplexer over a first network, the message requesting that data be communicated to the end user device over the first network;
   extracting an identifier from the message, wherein the identifier is representative of a second network address of a second network of a network data device that provides data to at least one end user device;
   comparing the identifier to a list of identifiers stored in a memory;
   determining if the identifier received from the end user device is included in the list of identifiers stored in the memory; and increasing the available bandwidth of a network connection with the end user device over the first network in response to the determination that the identifier of the network address of the network data device is in the list of identifiers.

10. The method of claim 9, wherein the multiplexer is simultaneously communicatively coupled to the first and second networks.

11. The method of claim 9, further comprising the steps of:
transmitting data over the second network after the data capacity of the communication connection between the network data device and the end user device is increased.

12. The method of claim 11, wherein data is transmitted from the end user device to the network data device.

13. The method of claim 11, wherein data is transmitted from the network data device to the end user device.

14. The method of claim 13, further comprising the steps of:
retrieving a message from an advertisement server after the data capacity of the communication connection is increased between the end user device and the network data device;
transmitting the message from the advertisement server to the end user device; and
displaying the message on the end user device.

15. The method of claim 11, wherein
the first and second networks communicate using different network protocols, and
the multiplexer is configured to convert messages between the first network protocol and the second network protocol.

16. The method of claim 11, wherein the multiplexing unit is configured to increase the data capacity of the communication link between the user device and network data unit when a data transmission begins between the user device and network data unit.

17. The method of claim 11, wherein the multiplexing unit is configured to lower the data capacity between the user device and the network data unit when the data transmission ends.

18. The method of claim 9, wherein the identifier is included in a TCP/IP network packet.

* * * * *

UNITED STATES PATENT AND TRADEMARK OFFICE
CERTIFICATE OF CORRECTION

PATENT NO. : 8,107,497 B2
APPLICATION NO. : 12/178363
DATED : January 31, 2012
INVENTOR(S) : Anthony J. Zerillo et al.

It is certified that error appears in the above-identified patent and that said Letters Patent is hereby corrected as shown below:

Column 4, Line 62, delete "and a network 110" and insert --and a network I/O--, therefor.

Column 7, Line 40, delete "If a advertisement" and insert --If an advertisement--, therefor.

Column 8, Line 29, delete "of claim 1, further" and insert --of claim 1,--, therefor.

Signed and Sealed this
Twenty-ninth Day of May, 2012

David J. Kappos
*Director of the United States Patent and Trademark Office*